Feb. 2, 1937. F. ULRICH 2,069,429
APPARATUS FOR THE MANUFACTURE OF SLIDE FASTENERS
Filed Oct. 15, 1935 4 Sheets-Sheet 1

INVENTOR
Frederick Ulrich
BY
James & Franklin
ATTORNEYS Feb. 2, 1937. F. ULRICH 2,069,429
APPARATUS FOR THE MANUFACTURE OF SLIDE FASTENERS
Filed Oct. 15, 1935 4 Sheets-Sheet 2

INVENTOR
Frederick Ulrich
BY
*James H. Franklin*
ATTORNEYS

Feb. 2, 1937.  F. ULRICH  2,069,429
APPARATUS FOR THE MANUFACTURE OF SLIDE FASTENERS
Filed Oct. 15, 1935  4 Sheets-Sheet 3

INVENTOR
Frederick Ulrich
BY
ATTORNEYS

Patented Feb. 2, 1937

2,069,429

UNITED STATES PATENT OFFICE 2,069,429

APPARATUS FOR THE MANUFACTURE OF SLIDE FASTENERS

Frederick Ulrich, New York, N. Y., assignor to Conmar Products Corporation, New York, N. Y., a corporation of New York Application October 15, 1935, Serial No. 45,035

21 Claims. (Cl. 29—33)

This invention relates to apparatus for the manufacture of slide fasteners.

The primary object of my invention is to generally improve apparatus for manufacturing slide fasteners, and more particularly to improve and supplement apparatus of the type set forth in my prior application Serial No. 720,232 filed April 12, 1934. In my said prior application, I disclose apparatus in which the interlocking elements of the slide fastener are discharged loosely into any desired receptacle. This necessitates hoppering or other treatment in order to align the elements in uniform fashion preparatory to mounting the same on a tape. An important object of the present invention is to avoid hoppering, and to instead keep the elements under positive control during manufacture and until the elements are fed to and affixed on a tape to form a completed stringer.

As was explained in my aforesaid application, numerous advantages are obtained during manufacture of the elements if they are made in pairs disposed with the heads adjacent one another. However, this disposes alternate elements in a direction opposite to that of the intermediate elements; and it is accordingly a further object of my invention to separate the alternate elements from the intermediate elements, thus bringing the same into two groups in each of which the elements are uniformly pointed in the same direction, preferably jaw first. These groups are simultaneously fed to two tapes, thus forming two stringers at one time.

To the accomplishment of the foregoing and numeous other objects which will hereinafter appear, my invention consists in the apparatus elements and their relation one to the other, as hereinafter are more particularly described in the specification and sought to be defined in the claims. The specification is accompanied by drawings in which:

Figure 21:
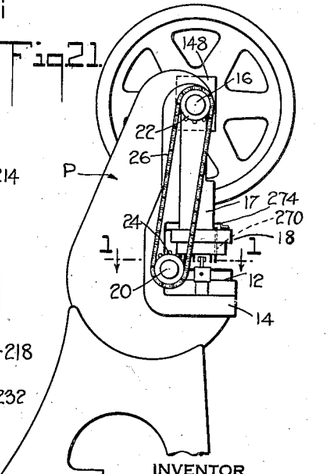
Fig. 21 shows the complete press assembly in profile.

Referring to the drawings and more particularly to Fig. 21, the apparatus comprises a press P of generally conventional type. Part of the apparatus subsequently described in greater detail, may be generally referred to as a die 12 which is mounted on the bed plate 14 of the press frame. A main driving shaft 16 is journaled at the top of the press frame and operates through appropriate eccentric and connecting rod mechanism to vertically reciprocate the upper press head 17. A punch plate 18 is mounted on press head 17 and carries a series of punches or tools for the successive operations. An auxiliary shaft 20 is located in and forms a part of the die assembly 12. This shaft is driven in synchronism with the main drive shaft 16 by appropriate gearing here exemplified by driving and driven sprockets 22 and 24 connected by a chain 26.

Figure 1:
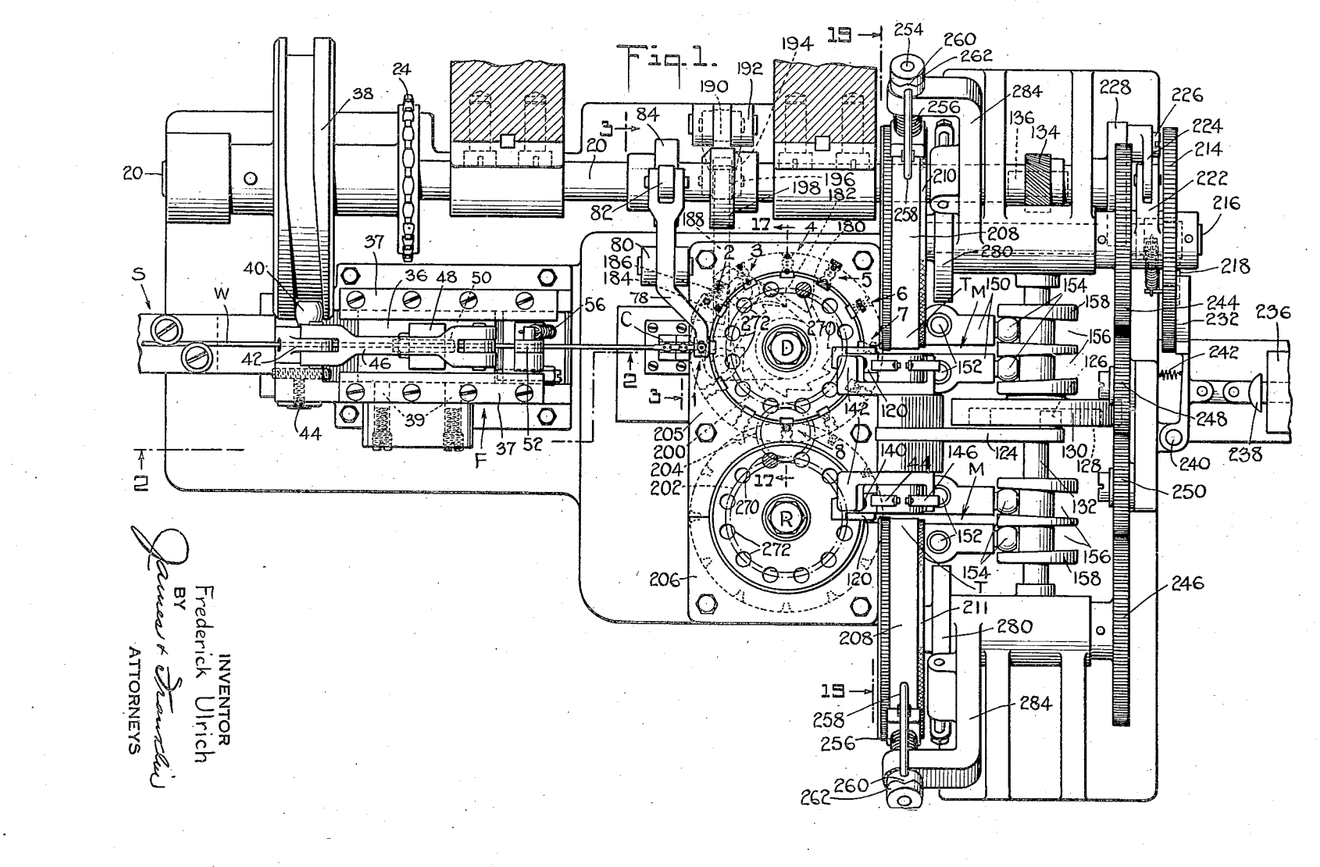
Fig. 1 is a horizontal section taken through apparatus embodying features of my invention, between the die and press head, as indicated by the line 1—1 in Fig. 21.

Referring now to Fig. 1 of the drawings, the mechanism mounted on the bed of the press includes a straightener S for preliminarily straightening wire stock W from which the fastener elements are formed; feed mechanism F for intermittently feeding the wire; a swaging or coining die C for pressing the wire to form embryo twin units; and a main dial D for moving the twin units past a series of stations at which successive operations are performed. The twin unit is severed from the continuous wire at station 1 and is next moved to station 2 where the ends are incised or split preparatory to the formation of jaws. The incised ends are thereupon spread apart to form jaws, and I prefer to accomplish the necessary spreading operation in two steps, the jaws being slightly spread at station 3 and further spread at station 4. The jaws are brought to finished shape by a shaving or trimming operation performed at station 5. At this time the twin units are completed but the individual elements remain connected head to head. These elements are severed by a separating punch at station 6.

It will be understood that the elements are preferably made two at a time or in twin units because of a number of important advantages, such as the large size and symmetry of the twin units, making the same easy to handle; the balance of the forces applied when operating on the same to incise, spread, and trim the jaws; and the economy in material and ease in forming two head portions adjacent one another. However, this process results in alternate elements being pointed in opposite directions, which is of little consequence when the elements are simply dropped or ejected into a bin for subsequent sorting or hoppering, but which is very significant when, as is here the case, the elements are intended to be kept under control and fed directly to and mounted on a tape. I overcome this difficulty by the provision of a duplex mounting mechanism including two tapes, alternate elements being fed to one of the tapes, and the intermediate elements being fed to the other tape. To separate the alternate elements, I have devised mechanism including two slightly overlapping dials. The outer elements are fed jaw first from the first dial to a tape adjacent the dial. The inner elements, which point with the jaws toward the center of the first dial, are dropped or transferred to the underlying peripheral portion of the second dial and then lie with the jaws pointing outwardly of the second dial. It is thus readily possible to feed the same jaw first to a second tape disposed adjacent the second dial.

The apparatus here illustrated has been simplified by combining the first of the separating dials with the operating dial D heretofore referred to. The reversing dial is indicated at R, while the duplex mounting apparatus is generally designated M, the tapes being fed at T. The outer element of each twin unit is fed from dial D to the adjacent tape at station 7. The inner element is carried through 90 degrees and then transferred to the reversing dial R at transfer station 8. When the element on dial R reaches the adjacent tape, it is fed outwardly jaw first from the dial to the tape and there mounted in place.

Considering the mechanism in greater detail, the straightener S is conventional and probably requires no description, it consisting simply of two series of wheels, one arranged in a vertical plane, and the other arranged in a horizontal plane. Only one end of the straightener is visible in Figs. 1 and 2 of the drawings.

Figure 2:
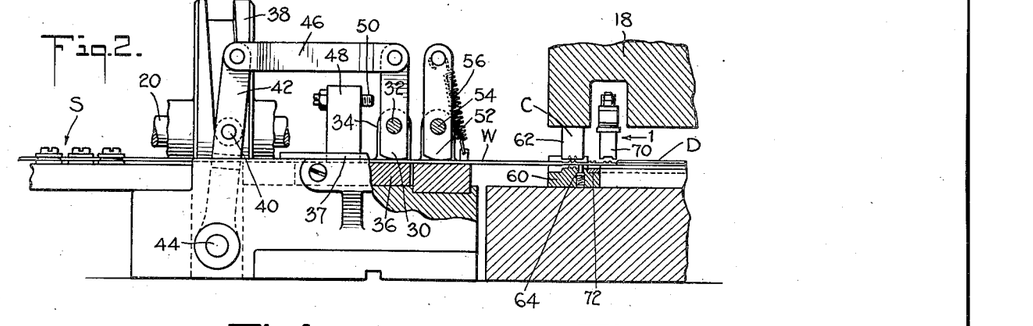
Fig. 2 is a partially sectioned fragmentary front elevation showing the feed mechanism and swaging punch, said section being taken in the plane of the line 2—2 of Fig. 1.

The feed mechanism F is best shown in Figs. 1 and 2, and comprises a camming member 30 oscillatable at 32 on bearings 34 projecting upwardly from a reciprocable base plate 36. Plate 36 rides between guides 37 the friction of which may be adjusted by spring-pressed plungers 39 (Fig. 1). The stock or wire W passes from straightener S to plate 36 where it may be clamped by cam 30. The latter is oscillated by a cylindrical cam 38 mounted on auxiliary shaft 20 and cooperating with a cam follower 40 mounted on a lever 42 stationarily pivoted at 44 and having its upper end connected to camming member 30 by means of a link 46. Slidable feed plate 36 carries an upwardly projecting arm 48 provided with an adjustable stop screw 50 disposed adjacent the camming member 30. When the camming member is oscillated backwardly or counter-clockwise, the wire is first released, after which camming member 30 bears against stop screw 50 and carries the entire feed assembly including the feed plate 36 rearwardly. At this time the wire is held against reverse movement by a suitable check dog here illustrated by a camming member 52 pivoted at 54 and normally biased in a counter-clockwise direction by a pull spring 56. The camming member 52 does not interfere with forward movement of the wire, but prevents backward movement thereof. When the feed plate 36 has moved to rearward position, continued rotation of cylindrical cam 38 moves link 46 forwardly, thus clamping cam 30 against the wire, after which continued movement of link 46 causes a bodily forward movement of the feed assembly and the wire.

After the feed mechanism, the wire reaches a swaging or coining station C which precedes the dial D. This station comprises simply a lower stationary die 60 which cooperates with a vertically reciprocable swaging punch 62 mounted directly in the punch plate 18 heretofore referred to as being fixed on the movable head of the press. The cooperating dies 60 and 62 are so shaped as to generally flatten the round wire stock except at the adjacent head portions of the units which are raised on top and recessed on bottom of the wire. Compared with the disclosure in my prior application Serial No. 720,232, I find that the heads may be pressed to final shape in a single operation, and further, that it is unnecessary to preliminarily incise the end or jaw portions of the units at this stage of the process. The operating life of the tools may be greatly prolonged by restricting the same at this point to the flattening and head forming operations indicated.

The bottom die 60 is preferably provided with a spring-pressed lifting pad 64 which functions to elevate the wire, thus clearing the recesses at the bottom of the wire from the die 60.

Figure 3:
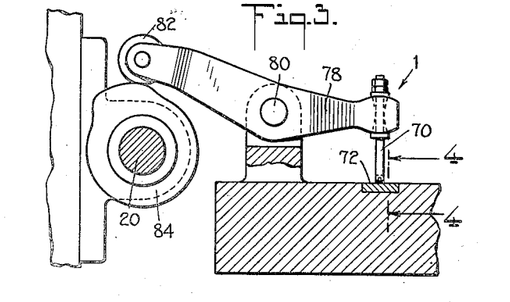
Fig. 3 is a transverse section taken in the plane of the line 3—3 of Fig. 1 and showing the cutting-off punch.
Figure 4:
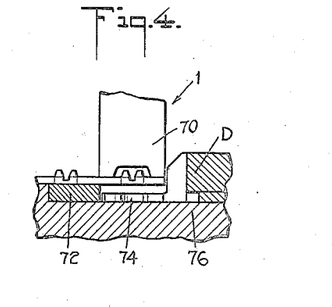
Fig. 4 is a section taken in the plane of the line 4—4 of Fig. 3, and shows the cutting-off punch and dial at the first station thereof.

The wire next reaches the dial D, and the leading or first twin unit on the wire is cut off at the first dial station which is shown in Figs. 2, 3, and 4 of the drawings. The cutting-off operation is performed by a punch 70 which cooperates with a stationary knife 72 to shear the twin units, as is best shown in Fig. 4. At this time the endmost twin unit is disposed directly above a mating pocket or recess 74 in the peripheral portion of dial D. The dial rests directly on and rotates over the smooth top surface of a suitable table 76.

The cutting-off punch 70 might be mounted on the main punch plate 18, but because the stock is preferably elongated during the swaging operation, I prefer to perform the cutting-off step slightly after the swaging step. To this end, the cutting-off punch 70 is separately driven, and mechanism for this purpose is illustrated in Figs. 1 and 3 in which it will be seen that the punch 70 is mounted on a lever 78 pivoted at 80 and carrying a cam follower roller 82. The latter rides on an operating cam 84 of suitable shape and timing, the said cam being secured to the auxiliary shaft 20 heretofore referred to.

Figure 5:
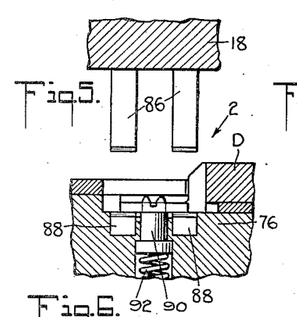
Fig. 5 is a section taken in elevation showing the splitting punch and dial at the second station thereof.
Figure 6:
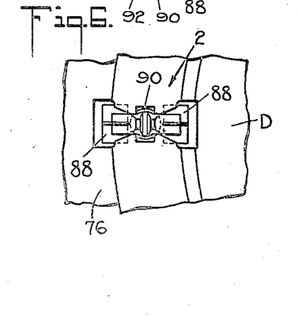
Fig. 6 is a plan view of the second station after operation on the unit.
Figure 7:
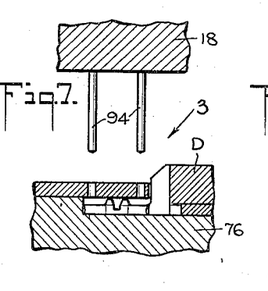
Fig. 7 is a section in elevation showing the first spreading punch and the dial at the third station thereof.

The twin unit is then moved by dial D from station 1 to station 2 which is best shown in Figs. 5 and 6 of the drawings. At this station the punch plate 18 is provided with a pair of splitting punches 86 adapted to longitudinally incise the flattened end portions of the unit. The unit rests above another pair of splitting punches 88 located beneath the dial. The unit is supported on a pad 90 normally held flush with the bottom of the dial by a compression spring 92. When punch plate 18 descends, the punches 86 incise the ends of the unit downwardly and at the same time carry the entire unit downwardly against the punches 88 which incise the ends of the unit upwardly. When the press head rises, the spring pad 90 lifts the split unit to a position flush with the bottom of dial plate D and the top of table 76.

Figure 8:
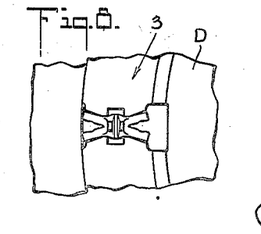
Fig. 8 is a plan view of the third station after operation on the unit.
Figures 9, 10:
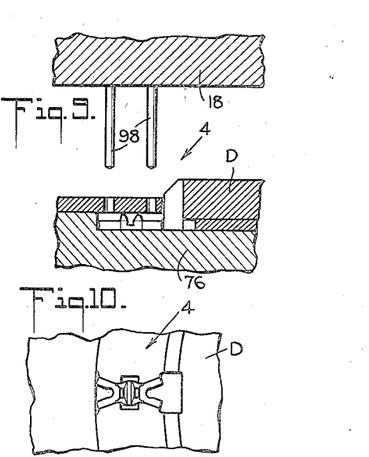
Fig. 9 is a section taken in elevation showing the second spreading punch and the dial at the fourth station.
Fig. 10 is a plan view of the fourth station after operation on the unit.

The dial plate next shifts the split unit to the spreading station 3. At this station the punch plate 18 carries a pair of relatively slender splitting punches 94. These may be cylindrical, with bluntly pointed tips. The spacing between the punches 94 is such as to locate the same relatively near the ends of the unit. This facilitates the spreading of the split ends to the condition illustrated in Fig. 8.

The unit is next moved by the dial plate to station 4 which is provided with another pair of spreading punches 98 which are preferably somewhat larger in diameter and somewhat more closely spaced. These punches operate to fully spread the jaws, at which time they are expanded into limiting engagement with the side walls of the recess in the dial plate.

Figure 11:
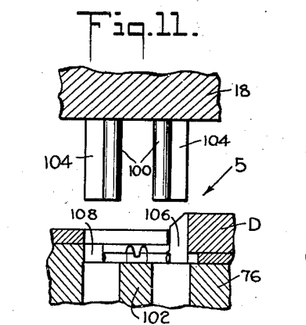
Fig. 11 is a section taken in elevation showing the trimming punch at the fifth dial station.
Figure 12:
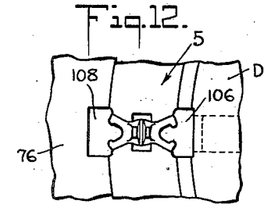
Fig. 12 is a plan view of the fifth station after operation on the unit.

The next dial station is illustrated in Figs. 11 and 12. At this station the punch plate 18 carries a pair of shaving or trimming punches 100 which cooperate with a mating female die 102 in table 76. The inner portions of punches 100 are so shaped as to give the jaws the desired undercut configuration shown in Fig. 12. The punches are strengthened by suitable enlarged heels 104 which fit into mating passages 106 and 108 respectively in the dial D and the dial table.

Figure 13:
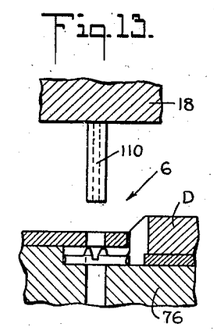
Fig. 13 is a vertical section taken in elevation showing the separating punch at the sixth dial station.
Figure 14:
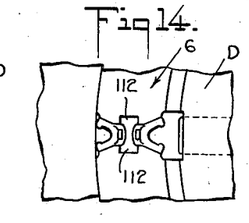
Fig. 14 is a plan view of the sixth station after operation on the unit.

At this time the twin unit as such is completed. The individual elements of the twin unit are complete except for the head to head connection, as well as a slight refinement in the shaping of the periphery or outline of the head, which may be accomplished while separating the elements. The separating station is illustrated in Figs. 13 and 14 of the drawings. At this station the punch plate 18 is provided with a separating punch 110 which is I-shaped in cross-section, the center or web portion operating to remove the material between the heads of the elements. The edge portions or heels 112 strengthen the punch and permit the same to shape the entire periphery of the head.

Figure 15:
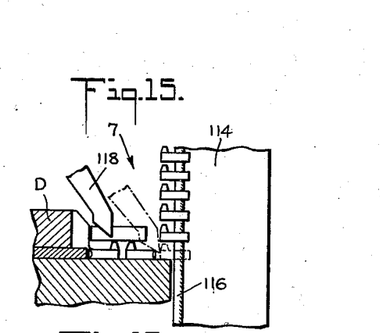
Fig. 15 is a vertical section showing the feed mechanism for feeding alternate elements to a tape at the seventh dial station.
Figure 16:
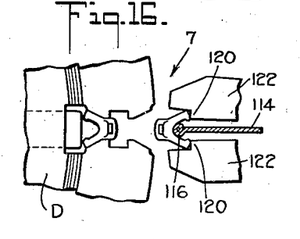
Fig. 16 is a plan view of the seventh dial station after the element has been fed to the tape and clamping jaws.

The seventh station is illustrated in Figs. 15 and 16. This is a mounting station at which the outer element of each unit or pair of elements is fixed to a tape. The tape is shown at 114 and is intermittently moved upwardly by mechanism subsequently described. The tape has the usual beaded edge 116 which is disposed immediately adjacent the outer periphery of the dial. A feed finger 118 is so shaped and moved that it changes from the solid to the broken line position shown in Fig. 15, thus clearing the inner element but bearing against and moving the outer element from the dial to the beaded edge 116 of the tape. The feed movement of the element is positively limited by shoulders 120 (Fig. 16) formed at the forward ends of sidewardly movable clamping jaws 122. When jaws 122 are moved together, the element is closed tightly against the beaded edge of the tape.

Figure 19:
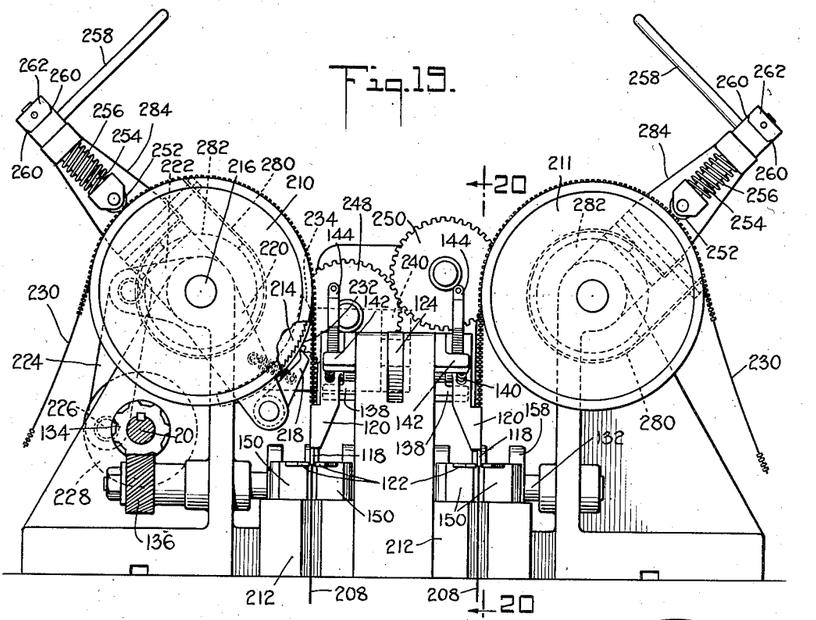
Fig. 19 is a section taken in elevation in the plane of the line 19—19 of Fig. 1, and shows the duplex mounting mechanism.
Figure 20:
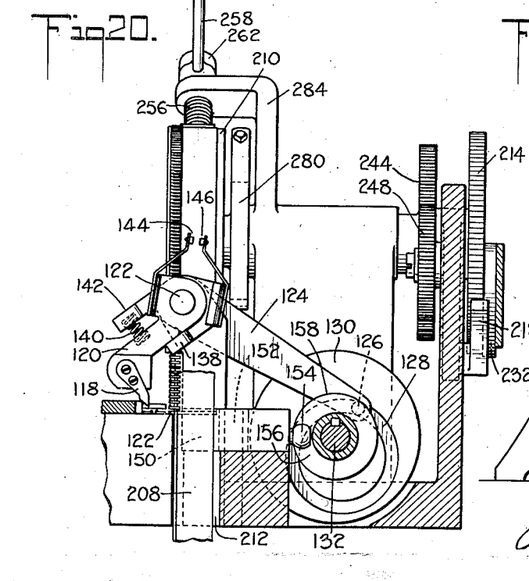
Fig. 20 is a vertical section taken in the plane of the line 20—20 in Fig. 19.

The mechanism for moving feed finger 118 is best shown in Figs. 1 and 20 of the drawings, referring to the latter of which it will be seen that the feed finger is mounted at the lower end of an arm 120 pivoted at 122 on a pin and moved by an arm 124 carrying a cam follower 126 received in a cam groove 128 on the face of a cam disc 130. As is best shown in Fig. 1, cam disc 130 is mounted on a shaft 132 which extends transversely of auxiliary shaft 20 heretofore referred to. Shafts 20 and 132 are connected to rotate in synchronism by means of a spiral gear 134 mounted on shaft 20 and meshing directly with a similar spiral gear 136 mounted on shaft 132. These gears are most clearly shown in Fig. 19.

Arms 120 and 124 are preferably not formed integrally but instead are yieldably interconnected. For this purpose, arm 124 is provided with a stop surface 138 against which arm 120 is normally held by a stiff compression spring 140 which is held between arm 120 and an extension 142 on arm 124. With this arrangement, arm 120 normally functions as though formed integrally with arm 124, but should the elements become misplaced or jammed in the dial plate, the apparatus is in no way injured, for the feed finger 118 may yield relative to arm 124 by compressing spring 140. To notify the operator of the difficulty and to instantly prevent further operation of the machine, I provide automatic safety mechanism including contacts 144 and 146 insulatedly mounted on the arms 120 and 124 respectively. These contacts are normally spaced as shown in Fig. 20, but when the feed finger encounters extraordinary resistance and spring 140 is compressed, the contacts 144 and 146 move into engagement, thereupon closing a suitable solenoid circuit which may be of conventional type and which is therefore not illustrated in detail. The solenoid is located at the main drive clutch of the press, schematically indicated at 148 in Fig. 21, and functions to release the clutch, thus freeing drive shaft 16 of the press and stopping the entire press.

In Fig. 16, reference was made to clamping jaws 122 which squeeze the element on the tape. The mechanism for operating these jaws is best shown in Figs. 1, 19, and 20. The jaws 122 (Figs. 16 and 19) are mounted on arms 150 (Figs. 19 and 20) which are pivoted at 152 (Figs. 1 and 20). These arms carry cam follower rollers 154 which are received in the cam grooves 156 of a cylindrical cam 158 which in turn is mounted on transverse shaft 132. By suitably shaping the cam grooves, the jaws may be forcibly moved together in proper time sequence, the closing of the jaws preferably taking place immediately after the feed movement of the element to the tape.

Figure 17:
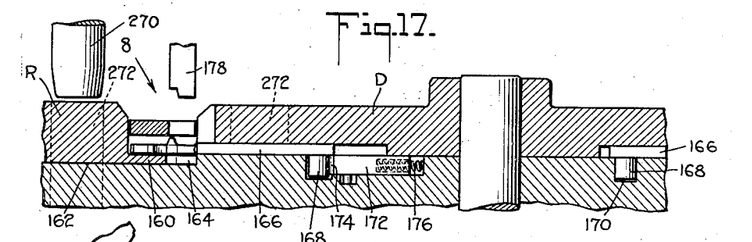
Fig. 17 is a vertical section taken in the plane of the line 17—17 in Fig. 1, and shows the eighth dial station at which the inner elements are transferred from the first to the second dial.
Figure 18:
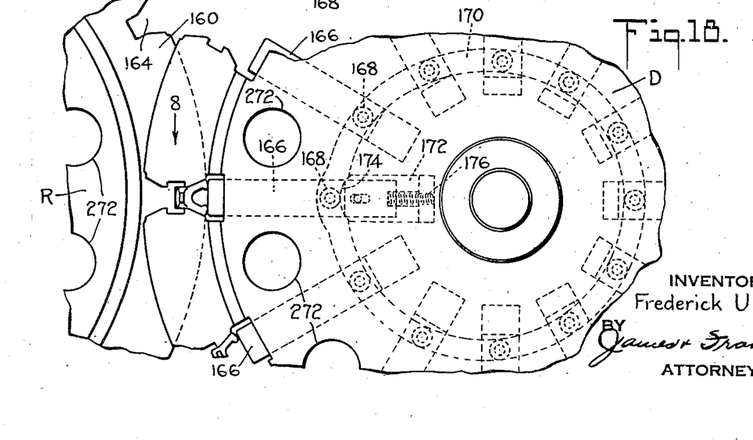
Fig. 18 is a plan view of the dials at the eighth or transfer station.

The inner element of the twin unit remains in dial plate D until the dial has moved to station 8. This station is illustrated in Figs. 17 and 18 of the drawings. By reference to Fig. 17, it will be noted that reversing dial R, like dial D, is provided with a thinned edge 160 in which the recesses for the elements are formed. Dial R rests directly on the smooth top surface 162 of the dial table, but in the present case the table is recessed more deeply so that the periphery 160 of dial R underlies the periphery of dial D. The recesses 164 of dial R are shaped to receive a single element rather than a double unit. When the pockets or recesses of the dials come into registration, the element on dial D tends to drop to dial R, and it is important to note that while the element is arranged with its jaws inwardly on dial D, it is disposed with its jaws outwardly on dial R. For simplicity, the dials D and R are preferably made with an equal number of pockets and moved in synchronism or 1 to 1 ratio by means subsequently described.

To prevent the element from tilting to improper position during the transfer from dial D to dial R, I prefer to frictionally restrain the element from gravitational movement and to positively transfer the element by a suitable transfer punch. For this purpose, dial D is provided with a series of radial slides 166, the end of each slide being disposed at one of the dial pockets. Each slide carries a cam follower roller 168 which rides in a cam groove 170. The slides 166 are normally held in retracted position and do not function until transfer station 8 is approached. At this station, cam groove 170 is increased in radius, thus permitting slide 166 to move outwardly. It is resiliently urged outwardly by a pusher plate 172 the curved forward end 174 of which bears against the cam follower 168. Plate 172 is itself moved by a compression spring 176. With this arrangement, the end of slide 166 bears against the element and wedges the same against the convergent sides of the dial pocket. The main punch plate carries a transfer punch 178 (Fig. 17) which is suitably shaped to bear on the top surface of the element and to transfer the same downwardly in horizontal position from the upper to the lower dial.

The element transferred to dial R is moved thereby from station 8 to a mounting station similar to that heretofore described, but utilizing another tape. For this purpose, the tape feed and mounting mechanisms are arranged entirely in duplicate, as is manifest upon inspection of Figs. 1 and 19. Arm 124 and cam 130 are common to both dials.

Dial D is advanced step by step, by suitable pawl and ratchet mechanism. Referring to Fig. 1, the ratchet is indicated at 180 and is moved by a pawl 182 mounted on a pawl plate 184 itself oscillatable about the dial axis. The pawl is resiliently urged into engagement with the ratchet by a compression spring 186. The pawl plate 184 is oscillated by a link 188 connected to the lower end of the vertical arm 190 of a bell crank lever pivoted at 192, the horizontal arm 194 of which carries a cam follower roller 196 riding beneath a cam 198 mounted on the auxiliary shaft 20.

Dial R is rotated synchronously with dial D by means of a gear 200 (Fig. 1) on dial D, meshing with a similar gear 202 on dial R through an intermediate direction-changing idler 204.

The peripheries of the dials D and R are covered by suitable cover plates 205 and 206. It will be understood from inspection of Figs. 5, 7, 9, 11, 13, 15, and 17, that the cover plates normally function to hold the elements in place in the dial pockets, as well as to protect the same from dirt, but that they are cut away at each of the stations to form appropriate passages for the various punches, feed fingers, and the like. It will also be understood that the cover plates have been intentionally omitted in Figs. 6, 8, 10, 12, 14, 16, and 18, in order to expose the fastener elements therebeneath.

To insure accurate indexing of the dials D and R, the punch plate 18 heretofore referred to is preferably provided with indexing punches indicated at 270 in Figs. 1 and 17. These cooperate with mating holes 272 in the dials and prevent injury to the tools or punches by reason of improper registration. Should the ratchet mechanism moving the dials fail to function properly so that the indexing punch does not come into alignment with a mating hole, I provide safety mechanism to immediately stop the operation of the press. For this purpose, the indexing punch, while tightly fitted in the punch plate, is unobstructed at its upper end for upward movement. A suitable electrical contact 274 (Fig. 21) is insulatedly mounted above the upper end of indexing punch 270, and if the dial is incorrectly indexed so that the punch strikes the solid top surface of the dial, the punch is forced upwardly and touches the contact 274, thereby closing a circuit leading to the solenoid mechanism at clutch 148 previously mentioned. The solenoid when energized releases the clutch, and stops the main drive shaft 16 of the press.

The tapes are fed by mechanism best shown in Figs. 1, 19, and 20. The tapes 208 are drawn from tape supply rolls or baskets (not shown) beneath the bed of the machine, and are drawn upwardly around suitably roughened or knurled feed drums 210 and 211. The tapes are accurately guided and frictionally restrained by tape guide blocks 212 (Fig. 19) located immediately below clamping jaw levers 150. Tape drum 210 is intermittently moved by pawl and ratchet mechanism including a ratchet 214 mounted on the outer end of a shaft 216 the inner end of which carries the drum 210. The ratchet is moved by a pawl 218 carried at one end of a pawl lever 220 centered on shaft 216 and having its opposite end 222 connected to a link 224. The lower end of link 224 is connected to a crank pin 226 secured to a crank disc 228 mounted at one end of auxiliary shaft 20. Each revolution of the auxiliary shaft, corresponding to one reciprocation of the press, advances the tape drum one step.

In machines of this kind, it is desirable to provide a substantial gap or space between the elements of one stringer and the elements of a succeeding stringer, such a space being illustrated at 230 in Fig. 19. In the present mechanism this is accomplished by making the normal stroke or pawl movement equivalent to the spacing between stringers. Most of the pawl stroke is normally made ineffective by a ratchet guard 232. The ratchet guard is so dimensioned that the pawl normally moves the ratchet wheel only a single tooth, that is, the upper edge 234 of the ratchet guard permits the pawl to reach the teeth of the ratchet wheel near the end of the pawl stroke. The resulting feed corresponds to the desired spacing between successive elements on the stringer. When the stringer reaches the intended length, as indicated by a suitable counter (not shown), an electrical circuit is closed, thus energizing a solenoid 236 (Fig. 1) the movable core 238 of which pulls ratchet guard 232 sidewardly about pivot 240, thus momentarily moving the ratchet guard out of the way of pawl 218 which then functions for its entire stroke and advances the tape by a substantial amount. The solenoid circuit being closed only momentarily, the ratchet guard returns to normal inward position under the influence of pull spring 242 as soon as the dial has finished its stroke.

Feed drum 211 is driven in synchronism with feed drum 210 by a suitable gear train here exemplified by similar gears 244 and 246 respectively connected to drums 210 and 211. These gears are brought into mesh by means of two idler gears 248 and 250. The direction of rotation of drum 211 is opposite that of drum 210, this arrangement being preferred because the tapes may then be disposed in as close proximity as desired while using feed drums of large diameter. This in turn is desirable in order to obtain ample friction to insure positive feed of the tapes. The desired friction is increased by using pressure rollers 252 carried at the ends of reciprocable rods 254 and pressed against the tapes by compression springs 256. The tape friction may be released, as when threading the machine with new tapes, by oscillating handles 258 which function, through camming surfaces 260, to elevate collars 262 which are pinned to the outer ends of the rods 254. The peripheries of the drums 210 and 211 are, of course, suitably cut away or reduced in diameter near one edge to receive the fastener elements.

The movement of the tape drums, may, if desired, be frictionally restrained by brake bands 280 drawn around brake drums 282 and anchored to frame arms 284. These prevent any slight movement of the drums which might be caused by reason of play in the mechanical parts of the feed, which might be noticed even if holding pawls are employed in addition to the feed pawl.

It is believed that the construction and operation of my improved apparatus for the manufacture of slide fasteners, as well as the many advantages thereof, will be apparent from the foregoing detailed description. The elements are formed from simple round wire stock, with resulting economy, although it is possible to use a strip of special cross-section, if desired. The formation of the elements in twin units facilitates the various splitting, spreading, and shaping operations because of the symmetry of the units and the forces applied thereto. The twin units are severed shortly after the swaging or coining operation, thus allowing for elongation of the material. By timing the cutting-off step to take place before release of the swaging die, the latter functions to hold the material tightly in place during the cutting-off step. Despite the fact that alternate elements are disposed in opposite direction, the elements are readily separated into two groups in each of which they all face in one direction. By means of only a single transfer operation, the elements are not only grouped but are faced jaw foremost in a single direction, thus placing the same in most favorable position for immediate attachment to the tapes. The duplex mounting arrangement is both convenient and fast, and keeps pace with the formation of the elements because these are also made in duplicate. In other words, the entire apparatus is duplex in character, and its output is double that of a comparable simplex machine for a given press speed. The tape feed is accomplished by comparatively simple mechanism, and the necessary tape advance between stringers is obtained by a single rapid stroke without interfering with or slowing up the manufacture and attachment of fastener elements. In the event of any interference with proper feed of elements to the tape, or in the event of improper indexing of the dials, the press is instantly stopped.

It will be apparent that while I have shown and described my invention in a preferred form, many changes and modifications may be made in the structure disclosed, without departing from the spirit of the invention, defined in the following claims.

I claim:

1. An apparatus for manufacturing slide fasteners, comprising means to form a series of interlocking fastener elements from a continuous strip of stock, alternate elements being faced in a direction opposite to that of the intermediate elements, means to separate the alternate elements from the intermediate elements in order to form two series of elements, whereby the elements of each series all face in one direction, and mechanism to operate the aforesaid means in proper time sequence.

2. An apparatus for manufacturing slide fasteners, comprising a drive shaft, means driven thereby to form a series of interlocking fastener elements in end to end relation from a continuous strip of wire, alternate elements being faced in a direction opposite to that of the intermediate elements, and means driven by said drive shaft to separate the alternate elements from the intermediate elements in order to form two series of elements, whereby the elements of each series all face in one direction.

3. An apparatus for manufacturing slide fasteners, comprising means to form a continuous series of interlocking fastener elements out of a continuous strip of stock, alternate elements being faced in a direction opposite to that of the intermediate elements, means to feed a pair of tapes, means to feed only alternate elements jaw first to one of the tapes, and means to separate the intermediate elements and to feed the same jaw first toward the other tape.

4. An apparatus for manufacturing slide fasteners, comprising means to form a continuous series of interlocking fastener elements in end to end relation out of a continuous wire, alternate elements being faced in a direction opposite to that of the intermediate elements, means to intermittently feed a pair of tapes, means to feed only alternate elements jaw first to one of the tapes, and means to separate the intermediate elements and to feed the same jaw first toward the other tape.

5. Apparatus for the manufacture of slide fasteners, comprising means to form slide fastener elements in twin units, in which the heads of the elements are arranged adjacent one another and the jaws remotely from one another, and means to separate the elements of said units and to arrange the same with their jaws in like direction, said means including a pair of overlapping dials, means to feed the units to the upper dial, means to feed the outer elements jaw first from the upper dial, means to lower the inner elements having their jaws pointed inwardly of the first dial to the underlying portion of the second dial whereon they lie with their jaws pointed outwardly, and means to feed said elements jaw first from said second dial.

6. Apparatus for the manufacture of slide fasteners, comprising means to form slide fastener elements in twin units, in which the heads of the elements are arranged adjacent one another and the jaws remotely from one another, means to simultaneously intermittently feed a pair of spaced tapes, and means to separate the elements of said units and to arrange the same with their jaws toward the tapes, said means including a pair of overlapping dials, means to feed the units to the upper dial, means to feed the outer elements jaw first from the upper dial to one of the tapes, means to lower the inner elements having their jaws pointed inwardly of the first dial to the underlying peripheral portion of the second dial whereon they lie with their jaws pointed outwardly, and means to feed said elements from said second dial to the second tape.

7. An apparatus for manufacturing slide fasteners, said apparatus including means to intermittently longitudinally feed a round wire having a cross-sectional area approximately equal to that of the elements, a swaging die for preliminarily shaping the wire in the form of successive elements, means to sever embryo elements from the wire, means to split the ends of the elements to form divergent jaws, means to spread and shape the jaws, means to intermittently feed a beaded tape, means to clamp the jaws of the successive elements in properly spaced relation on the beaded edge of the tape.

8. An apparatus for the manufacture of slide fasteners, including means to intermittently feed a wire, a swaging die for forming embryo elements thereof, a cutting-off punch for severing embryo elements from the wire, means for operating the swaging die and for operating the cutting-off punch later than the swaging die, means to thereafter spread and shape jaws on the ends of the elements, means to longitudinally feed a beaded tape, means to clamp the jaws of the successive elements in suitably spaced relation on the beaded edge of the tape.

9. An apparatus for the manufacture of slide fasteners, including means to feed a wire, a swaging die for forming pairs of opposed embryo elements arranged head to head, a cutting-off punch for severing said twin units from the wire, means to split and spread the ends of the units to form jaws, means for separating the elements of each unit, means to simultaneously intermittently feed a pair of beaded tapes, means to clamp the leading elements of the units to the beaded edge of one of said tapes, and means to clamp the trailing elements of the units to the beaded edge of the other of said tapes.

10. An apparatus for the manufacture of slide fasteners, including means to intermittently feed a continuous wire of cross-sectional area substantially equal to the transverse cross-sectional area of the elements, a swaging die for forming symmetrical sections approximately equal to the length of the two elements with heads at the center portion of said sections, a cutting-off punch for severing said sections from the wire, means for splitting and spreading the ends of the section to form divergent jaws, means for separating the elements in each section, means for simultaneously feeding a pair of collaterally disposed beaded tapes, means to clamp the jaws of the leading elements of the sections to one of said tapes, and means to clamp the jaws of the trailing elements of the sections to the other of said tapes.

11. An apparatus for the manufacture of slide fasteners, comprising means to intermittently feed a continuous wire of round cross-section, a swaging die for preliminarily shaping the round wire into sections approximately equal to the length of two elements with adjacent heads at the center portion of said sections, a cutting-off punch for severing the sections from the wire, means for receiving and moving said sections past successive stations for splitting and spreading the ends of the section to form divergent jaws, means for separating the elements of each section, means to simultaneously feed a pair of collaterally disposed beaded tapes, means to clamp the jaws of the leading elements of the sections on one of said tapes, and means to clamp the jaws of the trailing elements of the section to the other of said tapes.

12. Apparatus for the manufacture of slide fasteners, comprising means to intermittently feed a wire, a swaging die for forming embryo elements in the wire, a cutting-off punch for severing elements from the wire in end to end relation, a stationary table surmounted by an intermittently rotatable dial plate, means on said dial plate for receiving and moving the elements around the table through a series of stations for performing various finishing operations on the elements, means to intermittently feed a beaded tape transversely of said dial plate, means to feed the elements from the dial plate to the beaded edge of the tape, and means to affix the elements to the beaded edge of the tape.

13. Apparatus for the manufacture of slide fasteners, comprising means to intermittently feed a wire, a swaging die for forming units approximately equal to the length of two elements with adjacent heads at the center portion of said units, a cutting-off punch for severing the said twin units from the wire, intermittently rotatable means for receiving said units and for moving the same through a series of stations for performing various finishing operations on the elements, one of said stations including means for separating the elements of each unit, means for intermittently feeding a beaded tape at another station, and means for affixing alternate ones of the elements to said tape at said station.

14. Apparatus for the manufacture of slide fasteners, comprising means to intermittently feed a wire, a swaging die for forming units approximately equal to the length of two elements with adjacent heads at the center portion of said units, a cutting-off punch for severing the said twin units from the wire, intermittently rotatable means for receiving said units and for moving the same through a series of stations for performing various finishing operations on the elements, one of said stations including means for separating the elements of each unit, a second intermittently rotatable means overlapped by said first intermittently rotatable means, means to intermittently feed a beaded tape adjacent the first rotatable means, means to intermittently feed a beaded tape adjacent the second rotatable means, means to secure the outer elements of the units to the first of said tapes, means to transfer the inner elements of the units to the second rotatable means, and means to secure said latter elements to the second tape.

15. Apparatus for manufacturing slide fasteners, comprising a press having a stationary bed and a movable head, a die assembly mounted on said bed and including a punch plate secured to the head, feeding means for intermittently feeding a wire through the die assembly, a punch on said punch plate for preliminarily swaging the wire to form units each consisting of two embryo elements arranged head to head, a cutting-off punch for severing the twin units from the wire, an intermittently rotatable dial in said die assembly for receiving the units, a series of finishing punches operated by the punch plate for finishing the formation and separation of the elements, a second dial the periphery of which is overlapped by the first dial, means to intermittently feed a tape adjacent the first dial, means to intermittently feed a tape adjacent the second dial, means to affix the outer elements of the units to the first tape, means to transfer the inner elements of the units to the second dial, and means to affix said latter elements to the second tape.

16. Apparatus for manufacturing slide fasteners, comprising a press having a stationary bed, a movable head, and a top shaft for reciprocating the same, a die assembly mounted on said bed and including a punch plate secured to the head, an auxiliary shaft connected to the top shaft for simultaneous rotation, feeding means operated by said auxiliary shaft for intermittently feeding a wire through the die assembly, a punch on said punch plate for preliminarily swaging the wire to form embryo elements, a cutting-off punch for severing the elements from the wire, means on said auxiliary shaft for operating said cutting-off punch later than the swaging punch, an intermittently rotatable dial in said die assembly for receiving the elements, a series of finishing punches operated by the punch plate for finishing the formation of the elements, means to intermittently feed a tape adjacent said dial, and means to affix the finished elements to the tape.

17. Apparatus for manufacturing slide fasteners, comprising a press having a stationary bed, a movable head, and a top shaft for reciprocating said head, a die assembly mounted on said bed and including a punch plate secured to the head, an auxiliary shaft forming a part of said die assembly and connected to the top shaft for simultaneous rotation, feeding means operated by said auxiliary shaft for intermittently feeding a wire through the die assembly, a punch on said punch plate for preliminarily swaging the wire to form units each consisting of two embryo elements arranged head to head, a cutting-off punch for severing the twin units from the wire, means on said auxiliary shaft for operating said cutting-off punch later than the swaging punch, a dial plate in said die assembly for receiving the units, a second dial plate the periphery of which is overlapped by the first dial plate, means driven by said auxiliary shaft for intermittently rotating the dial plates, a series of finishing punches operated by the punch plate for finishing the formation and final separation of the elements, means including a second auxiliary shaft connected to the aforesaid top shaft and auxiliary shaft for intermittently feeding a pair of tapes each located adjacent one of said dial plates, clamping jaws operated by said second auxiliary shaft for affixing elements to the tapes, means to feed the outer elements of the units from the first dial to the adjacent tape, means to transfer the inner elements of the units from the first dial to the second dial, and means to feed the latter elements from the second dial to the adjacent tape.

18. A duplex apparatus for the manufacture of slide fasteners, said apparatus comprising means to intermittently feed a round wire, means to form joined pairs of slide fastener elements therefrom, means to feed two tapes, means to attach the first element of each pair to one of the tapes, means to attach the second element of each pair to the other of the tapes, means to separate the two elements in each pair after the elements have been otherwise completely formed, and mechanism to operate the aforesaid means in proper time sequence.

19. In apparatus for manufacturing slide fasteners, in combination, a drive shaft including a driving clutch, means driven thereby to feed fastener elements, a resiliently yieldable connection in said feed means, and means for releasing the clutch of the drive shaft when the feed means encounters abnormal resistance.

20. In apparatus for manufacturing slide fasteners, in combination, a drive shaft including a driving clutch, means driven thereby to intermittently feed a beaded tape, additional means driven thereby to feed fastener elements to the tape, a resiliently yieldable connection in said feed means, and means including normally spaced electrical contacts and appropriate electrical circuits connected thereto for releasing the clutch of the drive shaft when the feed means encounters abnormal resistance.

21. In an apparatus for the manufacture of slide fasteners, in combination, a press, a main drive shaft incluidng a driving clutch, a die including an intermittently rotatable dial plate, an indexing punch mounted on the head of said press for indexing said dial plate, and safety means including spaced electrical contacts disposed above said indexing punch and a circuit controlled thereby for releasing the clutch if the dial plate is improperly indexed.

FREDERICK ULRICH.